US006428869B1

(12) United States Patent
Ozgen et al.

(10) Patent No.: US 6,428,869 B1
(45) Date of Patent: Aug. 6, 2002

(54) PEEL AND STRIP MAGNETS AND METHOD OF MANUFACTURE THEREOF

(75) Inventors: Mehmet Sami Ozgen; Chris Bohlin, both of Chicago, IL (US)

(73) Assignee: Promotional Ideas, Inc., Des Plaines, IL (US)

( * ) Notice: Subject to any disclaimer, the term of this patent is extended or adjusted under 35 U.S.C. 154(b) by 0 days.

(21) Appl. No.: 09/118,331

(22) Filed: Jul. 17, 1998

(51) Int. Cl.[7] ........................................ B32B 9/00

(52) U.S. Cl. .................... 428/40.9; 428/41.8; 428/220; 428/332; 428/352; 428/354; 428/900

(58) Field of Search ................................ 156/257, 268, 156/248, 267, 270, 269; 428/41.8, 220, 332, 352, 354, 900, 40.9

(56) References Cited

U.S. PATENT DOCUMENTS 3,684,869 A * 8/1972 Reiter ........................ 360/131
4,098,935 A * 7/1978 Knudsen .................... 428/40.9
5,920,290 A * 7/1999 McDonough et al. ....... 343/873

* cited by examiner

*Primary Examiner*—Linda Gray
(74) *Attorney, Agent, or Firm*—Dennis A. Gross; The Hill Firm

(57) ABSTRACT

A sheet or strip of discreet magnets disposed on a common backing and a method of manufacturing a plurality of discreet magnets detachably adhered to a common backing is provided. The method includes the passing of a magnetic substrate that is detachably adhered to a common backing in front of a die. The die is equipped with an internal ejector so that when the die is moved towards the substrate and the cutting edge of the die cuts the substrate, an internal ejector engages the cut portion of the substrate that forms a cut magnet. As the die is withdrawn from the substrate, the ejector maintains a pressing engagement against the cut magnet to prevent the cut magnet from being pulled off of the backing. A similar apparatus may be provided for a stripper disposed outside of the die to prevent waste substrate from being pulled off of the backing as the die is removed. Both the stripper and internal ejector are pulled off of the magnetic material after the die has been successfully removed.

4 Claims, 2 Drawing Sheets

10
11
12
13
14
15
16
17
18
18a
18b
21
22
23
24
25
26
27
31
40
170
176

PEEL AND STRIP MAGNETS AND METHOD OF MANUFACTURE THEREOF

FIELD OF THE INVENTION

The present invention relates to flexible magnets having one side coated with an adhesive that is detachably adhered to a strip backing. More specifically, the present invention relates to an improved set of small flexible magnets having one side that is coated with adhesive and attached to a flexible backing in a strip form and an improved method of manufacturing such magnets.

BACKGROUND OF THE INVENTION

Sheets of flexible magnetic material detachably attached to a backing by way of an adhesive are known and available. Such available magnets include a piece or section of magnetic substrate with one side being coated with an adhesive. The coated side is then attached to a sheet of backing material, such as wax paper. These magnets are available only in individual or roll form and are not available in a set or group of discreet magnets attached to a common sheet or strip of backing paper which can be stripped and applied automatically with existing equipment.

Prior to the development of the present invention, a plurality of magnets disposed on a single, common backing was unavailable because of difficulties in cutting the magnetic material and stripping away the waste webbing of magnetic material from the backing layer. While, thin magnetic substrates are available and are easily cut by currently available dies, such as pressed dies or roller dies, however, the thin magnetic material itself will adhere to the cutting dies, which are fabricated from metal. The use of non-magnetic or non-metal dies have not solved this problem. Specifically, even if non-magnetic or non-metal material dies are used, the adhesion between the magnetic substrate and the backing strip is inadequate to retain the magnetic material on the backing strip. Hence, the magnetic material will still follow the die as the die moves away from the backing material after the cutting stroke and will therefore be removed from the backing material after cutting. As a result, flexible magnets are provided only in individual form, with individual sheets of backing material attached to the individual dies. A plurality of small flexible magnets disposed on a common backing is currently unavailable. Further, a plurality of small flexible magnets disposed in a single row on a common strip backing is also currently available due to the problem of the magnetic material adhering to the die during the cutting process.

There is a need for small, discreet magnets disposed on common backings in either a strip form or in a sheet form. Such materials would be highly useful for promotional material and would facilitate the automated assembly of promotional material. Accordingly, there is a need for a method of fabricating small, discreet magnets on a common strip backing or a common sheet of backing material.

SUMMARY OF THE INVENTION

The above need is addressed by the present invention which provides an improved method of manufacturing a plurality of discreet magnets detachably adhered to a common backing.

One method of the present invention comprises the steps of providing a magnetic substrate comprising a first side that is free of adhesive and a second side that is coated with adhesive and detachably adhered to a common backing. The substrate and backing are passed in front of a die with the first side of the magnetic substrate facing the die. The die is hollow and comprises a cutting edge that faces the first side of the magnetic backing. The cutting edge is shaped so as to define an outline for the magnets to be produced. The die further comprises an interior filled with an internal ejector. The method further includes the step of pressing the cutting edge of the die and the internal ejector against the first side of the magnetic substrate thereby cutting through the magnetic substrate but without cutting through the backing to create a cut magnet disposed on the backing. The method further includes the step of pulling the die away from the cut magnet while maintaining a pressing engagement between the internal ejector and the cut magnet so that the die is pulled away from the cut magnet without the cut magnet being pulled off of the backing. The method further includes the step of pulling the internal ejector away from the cut magnet without pulling the cut magnet off of the backing.

Due to the maintaining of the engagement between the internal ejector and the cut magnet after the magnet is cut by the die and during the pulling away of the die from the cut magnet, the cut magnet maintains its position on the backing without adhering to or being pulled off of the backing by the die. As a result, a plurality of discreet magnets may be formed on a single common backing material, such as a strip backing while using the modified cutting die of the present invention.

In an embodiment, the cut magnet is at least partially surrounded by waste magnetic substrate and the method of the present invention further comprises the step of removing the waste magnetic substrate from the backing.

In an embodiment, the method further comprises the steps of moving the cut magnet laterally away from the die and moving uncut magnetic substrate and backing in front of the die and thereafter repeating the pressing and pulling steps set forth above.

In an embodiment, the internal ejector comprises a compressible material with an outer surface that engages the first surface of the substrate. The outer surface of the internal ejector extends outward from the inside of the die and beyond the cutting edge of the die so that the internal ejector engages the first surface of the magnetic substrate before the cutting edge of the die engages the first surface of the magnetic substrate during the pressing step.

In an embodiment, the internal ejector comprises a resilient material and the outer surface of the internal ejector that engages the first surface of the substrate is disposed within the die so that the cutting edge engages the first surface of the magnetic substrate before the internal ejector engages the first surface of the substrate during the pressing step. However, an engagement between the internal ejector and the first surface of the substrate is maintained as the cutting edge of the die is pulled off of or away from the magnetic substrate.

In an embodiment, the internal ejector comprises an outer surface that is in alignment with the cutting edge of the die.

In an embodiment, the die further comprises an outer stripper that engages the waste magnetic substrate as the die is pulled away from the cut magnet to thereby prevent the waste magnetic substrate from adhering to the die and being pulled off of the backing.

In an embodiment, the internal ejector comprises foam.

In an embodiment, the internal ejector comprises a resilient material such as urethane.

In an embodiment, the present invention comprises an improved strip of flexible magnets detachably adhered to a common backing strip and made in accordance with the methods set forth above.

In an embodiment, the present invention provides an improved sheet of flexible magnets detachably adhered to a common backing sheet and made in accordance with the methods set forth above.

In an embodiment, the method of the present invention is further enhanced by use of a non-metallic die.

In an embodiment, a layer of sheet material is disposed between the first side of the magnetic substrate and the die to reduce the magnetic forces between the magnetic substrate and the die. Such a layer of sheet material may be paper or other suitable layered material that can be easily removed. Further, such a layer of sheet material may also be a layer of vinyl or other suitable polymer that has been printed on the first side of the magnetic substrate. The vinyl layer can carry an artistic or informative message, including a promotional message.

In an embodiment, the step of pressing the cutting edge of the die against the first side of the magnetic substrate is carried out by passing the magnetic substrate between two nip rollers, including an upper nip roller that carries a cutting edge and a lower nip roller that engages the underside of the backing. In an embodiment, the diameter of the rollers is reduced thereby providing less contact between the magnetic substrate and the roller carrying the die and thereby providing a reduced attraction between the magnetic substrate and the die and a reduced need for an ejector system.

In an embodiment, the method of the present invention further may employ the use of a magnetic roller or magnet disposed on an opposing side of the common backing from the cutting die to attract the magnetic substrate in a direction opposite from the cutting die and to thereby reduce the possibility of the magnetic substrate from sticking or otherwise being attracted to the cutting die.

In an embodiment, the magnetic substrate may have a normal polarity with a N/S orientation and, the cutting die has an opposite polarity with respect to the contacting substrate side. Accordingly, engagement of the cutting die against the first side of the magnetic substrate results in the magnetic substrate being magnetically repelled from the cutting die.

In an embodiment, the magnetic substrate is sandwiched between a vinyl film disposed on the first side thereof and a carrier film with adhesive coated on one or both sides of the carrier. if both sides of the carrier are coated, the carrier film, would be sandwiched between the magnetic substrate and a common backing. The method for cutting discreet magnets attached to a common backing is carried out in the same method as described above except that the carrier film is cut by the die. However, the employment of a an adhesive carrier film enhances the strength of the layered structure which facilitates the manufacturing process.

It is therefore an advantage of the present invention to provide an improved method of fabricating peel and strip flexible magnets.

Yet another advantage of the present invention is that it provides a method for manufacturing a plurality of discreet, flexible magnets cut from a common magnetic substrate and disposed in a common backing material.

Yet another advantage of the present invention is that it provides a solution to the problem of magnetic substrates adhering to cutting dies during the step of cutting the magnetic substrate with a cutting die.

And another advantage of the present invention is that it provides a plurality of discreet, flexible magnets detachably adhered to a common backing material as opposed to individual magnets equipped with their own individual backing sheets.

Other advantages and objects of the present invention will become apparent upon reading the following detailed description and appended claims, and upon reference to the accompanying drawings.

BRIEF DESCRIPTION OF THE DRAWINGS

For a more complete understanding of the present invention, reference should now be made to the embodiments illustrated in greater detail in the accompanying drawings and described below by way of examples of the present invention.

In the drawings.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

Figures 1, 2, 3, 4:
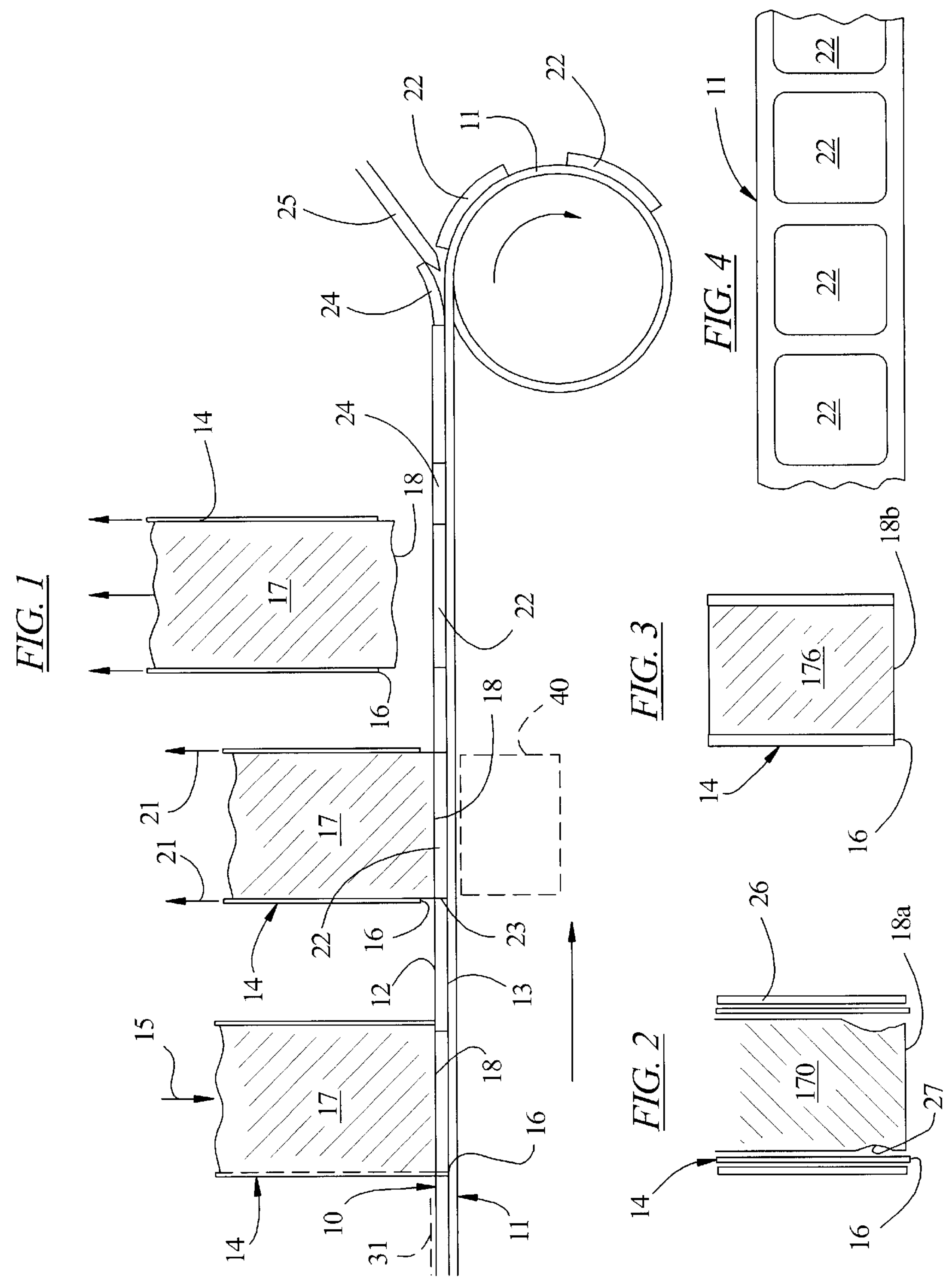
FIG. 1 is a schematic view of a cutting die being sequentially lowered into a cutting engagement with a magnetic substrate disposed on a backing sheet followed by the removal of the cutting die followed by the removal of the internal ejector away from the magnetic substrate.
FIG. 2 is a schematic illustration of an alternative embodiment of a die, internal ejector and stripper mechanism.
FIG. 3 is yet another alternative embodiment of a die and internal ejector mechanism.
FIG. 4 is a plan view of a plurality of magnets disposed on a common backing strip.

The method of the present invention is illustrated schematically in FIG. 1. Specifically, a magnetic substrate 10 is disposed on a common backing strip 11. The first side or upper side 12 of the substrate 10 is not coated with any adhesive material. In contrast, the second side or lower side 13 is coated with an adhesive material which detachably adheres the substrate 10 to the backing 11. Any adhesive suitable for a peel and strip-type application will be suitable such as adhesives used for decals and stickers and adhesives used to attach currently available singular magnets to backing strips such as wax paper. Further, the backing 11 can be wax paper or a plastic sheet. The various alternatives will be known to those skilled in the art.

Referring to the left side of FIG. 1, an optional coating or layer 31 may be disposed on top of the magnetic substrate 10. The coating 31 may be vinyl or another suitable polymer or a layer of paper. The coating or layer 31 can effectively reduce the magnetic attraction between the substrate 10 and the die 14 as discussed below in connection with FIG. 6. Also, the coating or layer 31 may be of a decorative nature or used for advertising.

As also shown toward the left in FIG. 1, a die 14 has been lowered in the direction of the arrow 15 so that the lower cutting edge 16 of the die has engaged the surface 12 of the substrate 10 and cut through the substrate 10 up to the point where the lower surface 13 of the substrate 10 engages the backing 11. Precision equipment is readily available so as to ensure that a thin substrate 10 can be cut without imparting undue damage to a thin paper backing 11.

The die 14 is filled with a material which will hereinafter be referred to as an internal ejector 17. The ejector 17 includes a lower or outer surface 18 which engages the upper surface 12 of the substrate 10. The purpose of the ejector 17 is illustrated towards the middle of FIG. 1. Specifically, as the die 14 is raised in the direction of the arrows 21, the ejector 17 maintains its position so that the outer surface 18 of the ejector 17 maintains a pressing engagement against the cut magnet shown at 22 and defined by the cut line shown at 23. By maintaining a pressing engagement of the ejector 17 against the upper surface 12 of the substrate 10, the cut magnet 22 is unable to adhere to or be attracted to the lower cutting edge 16 of the die 14. Thus, the cut magnet 22 will not stick or adhere to the die 14 and will maintain its position on the backing 11. Towards the right-center of FIG. 1, the entire die apparatus continues its upward movement with the die 14 and internal ejector 17 being raised above the upper surface 12 of the substrate 10. The combination substrate 10 and backing 11 are then moved to the right as shown in FIG. 1 where the waste substrate material shown at 24 is removed by the edge tool shown at 25. Towards the far right of FIG. 1, a plurality of discreet cut magnets 22 are disposed on the common backing sheet or strip 11. The magnets can range from about 1 $in^2$ to about 10 $in^2$ in size and from about 1 mil to about 15 mil in thickness.

Figure 7:
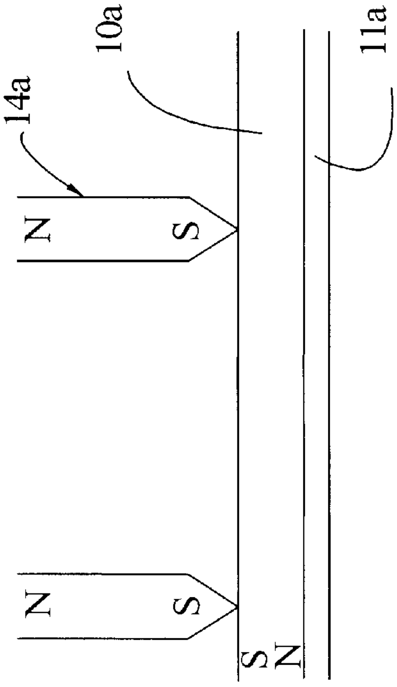
FIG. 7 is a partial view of a die engaging a magnetic substrate in an alternative embodiment of the present invention.

Still referring to FIG. 1, a magnet 40 may be disposed underneath the backing layer 11 to reduce the likelihood of the cut magnet from sticking or being attracted to the die 14. Also, a die 14*a* could be employed with a polarity that is opposite to that of the substrate 10*a* as shown in FIG. 7. Thus, the die 14*a* actually repels, as opposed to attracts, the substrate 10*a*.

It will be noted that the magnets can be disposed on a single sheet in a plurality of rows or columns as well as the strip-type backing 11 shown in FIG. 4.

Turning to FIG. 2, a die 14 is equipped with an internal ejector 17*a* as well as an outer stripper 26. The outer stripper 26 engages the waste substrate 24 and prevents the waste substrate 24 from being drawn upward as the die 14 and ejector 17*a* are drawn upwards after the cutting step as shown in FIG. 1. The internal ejector 17*a*, instead of a compressible material as illustrated in FIG. 1, is made of a less compressible or incompressible material but a material which has a resilient quality such as urethane. The circumferential groove or slot 27 is provided to accommodate the material as the ejector 17*a* is pressed downward onto the surface 12 of the substrate 10. Because of the relatively incompressible, but resilient nature of the ejector 17*a*, it will be noted that the lower surface 18*a* of the ejector is disposed inside or upwards from the cutting edge 16 of the die 14. However, as the die is raised upward, the outer surface 18*a* of the ejector 17*a* will maintain a pressing contact with the cut magnet 22 as shown in FIG. 1.

Turning to FIG. 3, another internal ejector 17*b* is illustrated with a lower or outer surface 18*b* in a general alignment with the cutting edge of the die 14. The relative position of the lower or outer surfaces 18, 18*a* and 18*b* of the internal ejectors 17, 17*a* and 17*b* will depend upon the compressibility and resiliency of the material used to fabricate the ejector. If a soft, compressible foam material is used, the lower surface 18 will most likely be disposed below or outside of the cutting edge 16 as shown in FIG. 1. In contrast, if a harder, less compressible but resilient material such as urethane is used, the position of the outer surface 18*a* may be disposed just inside of the cutting edge 16 as shown in FIG. 2. A material, such as a stiff foam material, falling in between a soft, compressible foam and a relatively incompressible but resilient material may require an outer surface 18*b* in a general alignment with the cutting edge 16 as shown in FIG. 3. In any event, the resiliency of the material used to fabricate the ejector 17, 17*a* or 17*b* should maintain an ejection pressure or pressing engagement against the cut magnet as the die 14 is withdrawn from the magnetic substrate 10.

It will be noted that a non-metallic die, such as a ceramic die may be employed to reduce the attraction between the magnetic substrate 10 and the die 14. Further, referring to FIG. 6, it will be noted that an additional layer 31 may be disposed on top of the magnetic substrate 14*a*. The additional layer 31, may be a paper sheet or other removable layer that can be used to reduce the attraction between the magnetic substrate 14*a* and a die, such as the one shown at 14 in FIGS. 1–3. The additional layer 31 may also be a ink paper or vinyl layer that has been printed onto the top of the substrate 14*a* for either decorative or informative purposes. It will be noted that magnets of this type are often used for promotional purposes and therefore the vinyl layer 31 may carry a promotional message.

Figure 6:
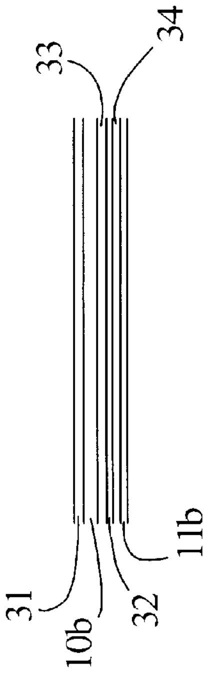
FIG. 6 illustrates an alternative embodiment which includes a magnetic substrate disposed between a vinyl layer and a carrier film, both sides of the carrier film being coated with adhesive with the carrier film being disposed between the magnetic substrate and a backing layer.

Still referring to FIG. 6, the magnetic substrate 14*a* may be attached to a carrier layer 32, and one or both sides of the carrier are coated with adhesive as shown by the adhesive layers 33, 34. The lower adhesive layer 34 attaches the carrier sheet 32 to the backing layer 11*a* for the embodiment with the double coated carrier 32.

Figure 5:
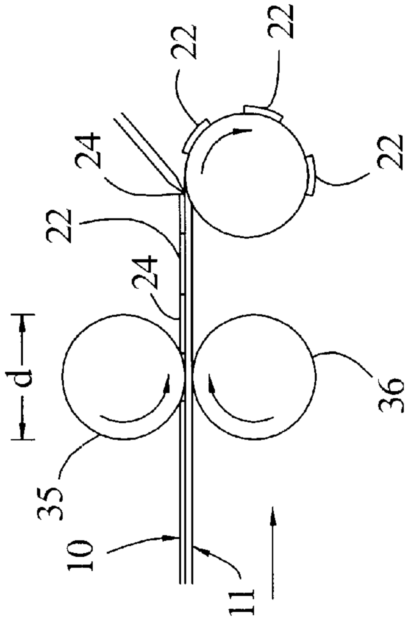
FIG. 5 illustrates, schematically, a magnetic substrate disposed on a backing sheet and passing between two nip rollers, one of which carries a cutting die for cutting discreet magnets and a take-up roller for transporting the backing end discreet magnets away from an edge tool used for removing waste substrate from the backing.

Turning to FIG. 5, it will be noted that a stamping die like the one shown in FIGS. 1–3 need not be utilized, but the substrate 10 and backing layer 11 may be passed between two nip rollers 35, 36. As shown schematically in FIG. 5, the nip roller 35 accommodates a cutting die while the nip roller 36 provides support for the backing layer 11. Various designs for roller dies 35, 36 will be apparent to those skilled in the art and their operation is not explained in detail here. However, it will be noted that roller dies of varying diameters d can be utilized. In accordance with the present invention, the size or diameters d of the roller dies 35, 36 can be reduced to thereby reduce the amount of contact between the metal roller die 35 and the magnetic substrate 10 to thereby reduce the attraction between the magnetic substrate 10 and the roller die 35 to alleviate the problem of the discreet magnets 22 from sticking to the roller die 35. Also, the lower roller die 36 may be magnetized slightly to help maintain the position of the cut magnets 22 on the backing 11. Further, the polarity of the roller die 35 can be reversed in relation to the polarity of the substrate 10 as discussed above with respect to FIG. 7. Finally, the roller die 35 may be equipped with an internal ejector as discussed above with respect to FIGS. 1–3.

It will be apparent to those skilled in art that the term "magnet" as used herein refers to a structure which has a magnetic field sufficient to stick the structure to a metal surface.

From the above description, it is apparent that the advantages and objects of the present invention have been achieved. While only certain embodiments have been set forth, alternative embodiments and various modifications will be apparent from the above description to those skilled in the art.

What is claimed is:

1. An improved strip of flexible magnets made in accordance with the following method:

providing a magnetic substrate including a magnetic material exhibiting a magnetic field sufficient to stick the flexible magnet to a metal surface, said substrate comprising an first side that is free of adhesive and a second side that is detachably adhered to a backing, passing the magnetic substrate and backing in front of a die with the first side of the magnetic substrate facing the die, the die being hollow and comprising a cutting edge that faces the first side of the magnetic backing, the cutting edge of the die defining an outline for a magnet, the die further comprising an interior filled with an internal ejector, pressing the cutting edge of the die and internal ejector against the first side of the magnetic substrate thereby cutting through the magnetic substrate but without cutting through the strip backing to create a cut magnet disposed on the strip backing, the cut magnet being at least partially surrounded by waste magnetic substrate, pulling the die away from the cut magnet while maintaining a pressing engagement between the internal ejector and the cut magnet so that the die is pulled away from the cut magnet without the cut magnet being pulled off the backing, pulling the internal ejector away from the cut magnet without pulling the cut magnet off the backing, moving the cut magnet laterally away from the die and moving uncut magnetic substrate and strip backing in front of the die, repeating the pressing and pulling steps, removing the waste magnetic substrate from the backing.

2. The strip of flexible magnets of claim 1 wherein the magnetic substrate has a thickness ranging from about 10 mil to 15 mil.

3. The strip of flexible magnets of claim 1 wherein the cut magnets range from about 1 $in^2$ to about 10 $in^2$.

4. An improved strip of flexible magnet comprising:

a plurally of discreet magnets comprising a portion of a magnetic substrate including a magnetic material exhibiting a magnetic field sufficient to stick the flexible magnet to a metal surface, said substrate having a first side and a second side, the first side of the magnetic substrate being coated with a layer of vinyl, the second side of the magnetic substrate being adhered to a carrier film, the carrier film comprising a first side and a second side, both the first side and second side of the carrier film being coated with adhesive, the first side of the carrier film being connected to the second side of the magnetic substrate, the second side of the carrier film being detachably connected to a backing layer.

* * * * *